United States Patent
Sato

(10) Patent No.: US 6,767,072 B1
(45) Date of Patent: Jul. 27, 2004

(54) INK-JET RECORDING METHOD AND APPARATUS

(75) Inventor: Hitoshi Sato, Tokyo (JP)

(73) Assignee: Canon Finetech Inc., Ibaraki (JP)

( * ) Notice: Subject to any disclaimer, the term of this patent is extended or adjusted under 35 U.S.C. 154(b) by 0 days.

(21) Appl. No.: 09/701,777

(22) PCT Filed: May 27, 1999

(86) PCT No.: PCT/JP99/02798

§ 371 (c)(1),
(2), (4) Date: Dec. 1, 2000

(87) PCT Pub. No.: WO00/73076

PCT Pub. Date: Dec. 7, 2000

(51) Int. Cl.[7] .............................................. B41J 29/38
(52) U.S. Cl. .......................................... 347/5; 358/1.9
(58) Field of Search ................................ 347/5, 14, 15, 347/19, 43; 358/1.9, 406, 502, 504, 462

(56) References Cited

U.S. PATENT DOCUMENTS

| | | | |
|---|---|---|---|
| 4,649,500 A | * 3/1987 | Yamada et al. | 101/170 |
| 4,908,638 A | * 3/1990 | Albosta et al. | 347/43 |
| 5,515,479 A | * 5/1996 | Klassen | 358/1.9 |
| 5,602,572 A | * 2/1997 | Rylander | 347/15 |
| 5,699,492 A | * 12/1997 | Karaki | 358/1.9 |
| 5,704,021 A | * 12/1997 | Smith et al. | 358/502 |
| 5,731,823 A | * 3/1998 | Miller et al. | 347/5 |
| 5,774,146 A | * 6/1998 | Mizutani | 347/43 |
| 6,008,812 A | * 12/1999 | Ueda et al. | 345/418 |
| 6,341,020 B1 | * 1/2002 | Rumph et al. | 358/1.9 |

FOREIGN PATENT DOCUMENTS

| | | |
|---|---|---|
| JP | 3-293135 | 12/1991 |
| JP | 4-131258 | 5/1992 |
| JP | 7-101052 | 4/1995 |
| JP | 10-250119 | 9/1998 |

OTHER PUBLICATIONS

Frank Cost, Pocket Guide to Digital Printing, 1997, Delmar, pp. 113–124.*

* cited by examiner

Primary Examiner—Juanita Stephens
Assistant Examiner—Blaise Mouttet
(74) Attorney, Agent, or Firm—Dellett & Walters

(57) ABSTRACT

An ink jet printing method and device in which an interpreter of the ink jet recording device reduces a splash (splash event) of ink during the printing of a solid-drawing area. The interpreter analyzes a command and data which indicate the drawing of a thick-line or a filled-in area. After the analysis, vector data of the thick line or the filled-in area is converted into raster data based on a given data pattern and, based on the raster data, ink is ejected with the recording head moving over a recording medium. Prior to the rasterization, the interpreter checks each of the thick line or the filled-in area to be drawn as to whether the data pattern indicates solid-drawing (S44). If the data pattern indicates solid-drawing, the interpreter changes the data pattern to a lower-density pattern (S47).

12 Claims, 9 Drawing Sheets

F I G. 5
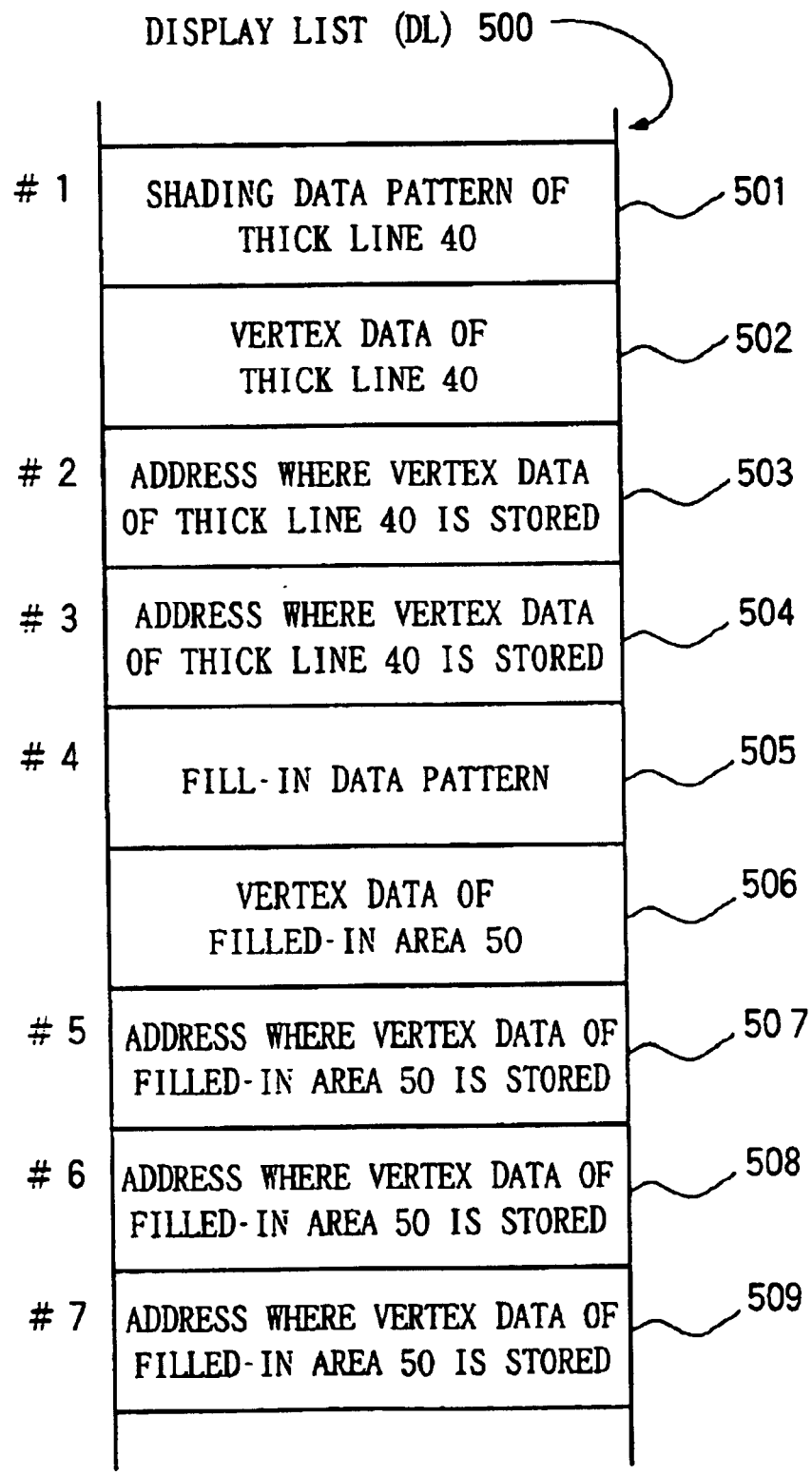

INK-JET RECORDING METHOD AND APPARATUS

TECHNICAL FIELD

The present invention relates to an ink-jet recording device which records an image by a single-pass recording method.

BACKGROUND ART

Usually, an ink-jet recording device repeatedly moves a recording head, with a plurality of ink-ejecting nozzles arranged thereon, in the direction different from the nozzle arrangement direction to print an image. A band of image area (band) is formed during each movement of the recording head. Repeatedly forming such bands completes the recording of the whole image.

When a high-density image with fill-in areas is recorded during such band formation, ink could be scattered depending upon the material or the surface condition of a recording medium. This event, called a "splash", may cause an unevenly printed image.

A multi-pass recording method, which records one band in several passes of the head, can prevent the splash because the recording density of each pass is reduced. However, the recording speed in the multi-pass recording method is degraded.

Another method which reduces the per-dot ink ejection amount could be employed. However, reducing the ink ejection amount causes distortion of dots, that is called "line stepping".

For use with the single-pass method, there are several other technologies for preventing unevenly printed images caused by splashes. One of them is to perform a VRC (Vector-to-Raster Conversion) for converting print data format from vector into raster, to check the bit-mapped image data, which is expanded in the frame memory, to find solid-drawing filled-in areas, and then to reduce the density of the area inside each filled-in area, except the filled-in boundary, in order to prevent an unevenly-printed image caused by splashes. However, checking the frame memory, which contains raster-converted print data, for finding filled-in areas on a software basis requires that the frame memory be checked one bit at a time, thus increasing the processing time. On the other hand, making this search on a hardware basis will increase the cost of the device. For this reason, this technology is not practical on a standard ink jet recording device.

Therefore, to solve the problem described above, it is an object of the present invention to provide a single-pass ink jet recording method and device capable of reducing an ink splash (splash event), which is caused when a solid-drawing area is printed, through the processing of the interpreter of the ink jet recording device which forms a fill-in data pattern and a thick line shading data pattern.

It is another object of the present invention to provide a single-pass ink jet recording method and device capable of reducing a splash event depending upon the difference in the ink jet recording devices or in the ink running characteristics of the recording medium.

DISCLOSURE OF INVENTION

An ink-jet recording method according to the present invention receives a command and data which indicate a drawing of a thick line or a filled-in area, analyzes the command and the data by an interpreter, converts vector data of the thick line or the filled-in area into raster data based on a given data pattern after the analysis, and, based on the raster data, ejects ink droplets while moving a recording head over a recording medium with a plurality of ink ejection nozzles arranged thereon, the method comprising the steps of: before converting to the raster data, checking by the interpreter whether the data pattern indicates solid-drawing in each of the thick line or the filled-in area for which the drawing is indicated; and, if the data pattern indicates solid-drawing, changing the data pattern to a lower-density pattern, thereby preventing an ink splash during printing.

This configuration allows the ink jet recording device to reduce the density of the solid-drawing area of a thick-line or a filled-in area and to reduce the splashes without having to change the processing performed on an external computer terminal and so on and without the need for searching the frame memory for filled-in areas.

The interpreter may change the data pattern, for example, using a predetermined mask pattern. This makes it easy to change the data pattern.

Preferably, one mask pattern should be selected from a plurality of predetermined mask patterns according to a type of the recording medium. This allows the density to be reduced according to the type of recording medium.

If the thickness of the thick line is smaller than a predetermined thickness, the data pattern remains unchanged which will eliminate an unnecessary process to be performed and reduce the processing load.

It is preferable that the data pattern be changed at least for black ink.

An ink-jet recording device according to the present invention comprises an interpreter for analyzing a command and data which indicate a drawing of a thick line or a filled-in area; means for converting vector data of the thick line or the filled-in area into raster data based on a given data pattern after the analysis by the interpreter; and a recording head for ejecting ink droplets, based on the raster data, while moving over a recording medium with a plurality of ink ejection nozzles arranged thereon, wherein the interpreter includes a pattern changing means for checking whether the data pattern indicates solid-drawing in each of the thick line or the filled-in area for which the drawing is indicated and, if the solid-drawing is indicated, changing the data pattern to a lower-density pattern.

The data pattern changing means may change the data pattern by using a predetermined mask table which stores therein a predetermined mask pattern.

Preferably, the predetermined mask table contains a plurality of mask patterns each corresponding to a type of the recording medium and the pattern changing means selects one of the mask patterns according to the type of the recording medium used.

The present invention is suitable for an ink jet recording method and device employing a single-pass recording method.

BRIEF DESCRIPTION OF DRAWINGS

FIG. 5 is a diagram showing a display list DL corresponding to the example shown in FIG. 4.

BEST MODE FOR CARRYING OUT THE INVENTION

An embodiment according to the present invention will be described in detail with reference to the attached drawings. In the description of the embodiment, a plotter will be described as an example of an ink jet recording device according to the present invention.

Figure 1:
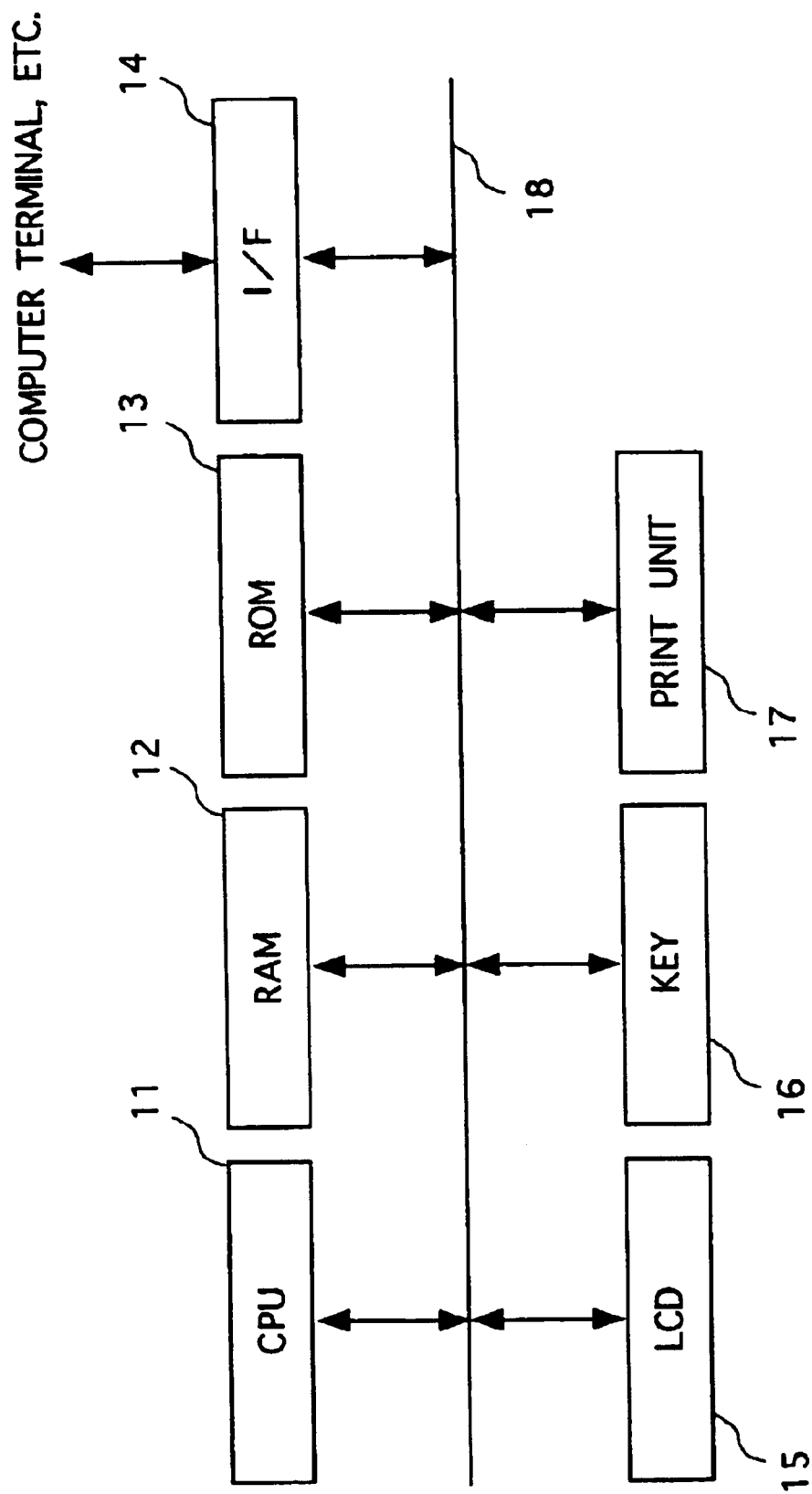
FIG. 1 is a block diagram showing a hardware configuration of a plotter which is used in an embodiment of an ink jet recording device according to the present invention.

FIG. 1 is a block diagram showing the general configuration of the plotter used in the embodiment. In FIG. 1, numeral 11 indicates a CPU for controlling the overall operation of the device. Numeral 12 indicates a RAM used as the work area for the CPU 11 or a temporary data storage area. Numeral 13 indicates a ROM for storing therein data and programs which are executed by the CPU 11 to operate the ink-jet recording device. Numeral 14 indicates an interface via which the ink jet recording device connects to an external computer terminal and the like. Via this interface, drawing commands or plotter description language data including thick-line data (having start-point and end-point coordinates) and fill-in data ( including vertices of approximate polygons) are transferred. Numeral 15 indicates a liquid crystal display (LCD) for displaying man-machine interface information, and numeral 16 indicates a key operation unit for selecting and specifying the setting of the ink-jet recording device. Numeral 17 is a print unit using an ink jet head, and numeral 18 indicates a system bus for connecting the CPU 11 to other elements.

The ink jet head in the print unit 17 has 128 nozzles for each color in this embodiment. Normally, for color printing, yellow, magenta, and cyan inks are used in addition to black. The degradation of image quality due to splashes is conspicuous for black ink, but less for other colors. Therefore; in this embodiment, the present invention applies only to black.

Figure 2:
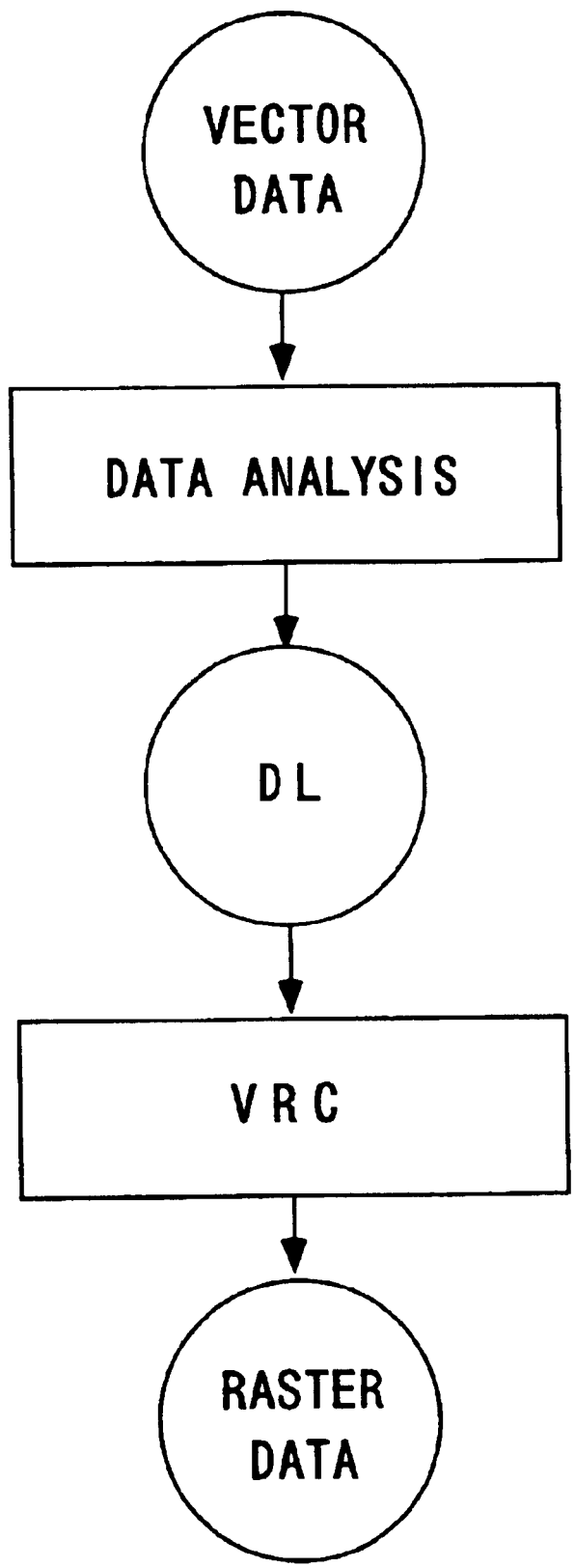
FIG. 2 is a diagram showing data conversion which is performed in the plotter shown in FIG. 1.

As shown in FIG. 2, the plotter in this embodiment performs data analysis processing for thick-line data to convert the data to an intermediate language called a display list (DL). This thick line data, received from an external unit, are included in the vector data which are written in the plotter description language. Then, the plotter performs a vector-to-raster conversion (VRC) based on this display list. As will be described later, the display list is data generated by temporarily converting the vector data of thick-lines or filled-in areas to a format suitable for a band-basis raster conversion during the VRC processing. This list, per se, is known. Ink droplets are ejected from the ink jet head in a band-by-band manner in response to the raster-converted image data.

As will be detailed below, the present invention takes measures for preventing splashes during a process in which vector data are converted into raster data.

Figure 3:
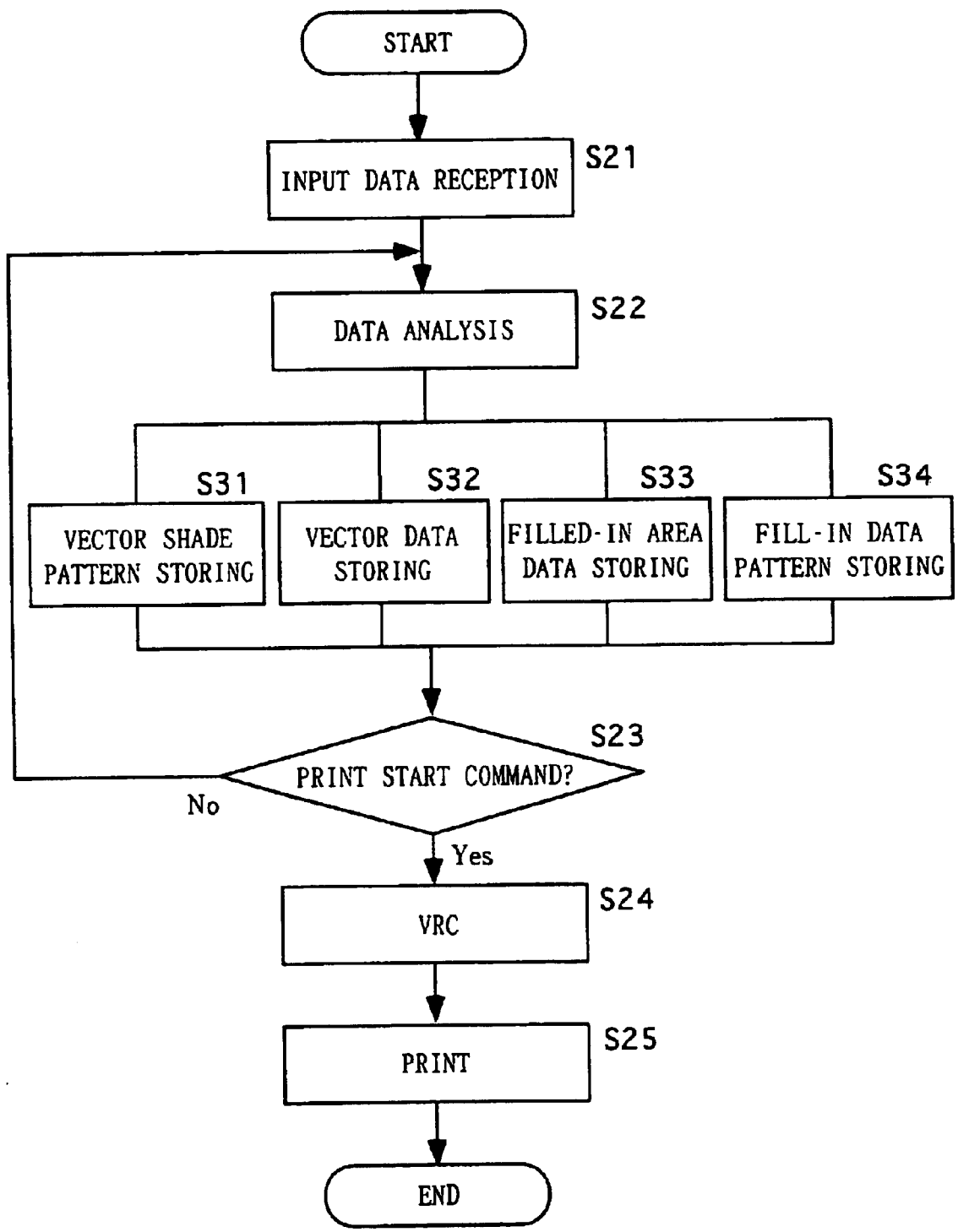
FIG. 3 is a flowchart showing the processing flow, from input data reception to printing, of the plotter shown in FIG. 1.

FIG. 3 is a processing flowchart from input data reception to printing.

First, input data (data written in the plotter description language) is received from an external unit (S21). Data analysis is made on the received data in accordance with the format of data written in the plotter description language (S22). This data analysis means is generally called an "interpreter". As a result of data analysis, processing steps S31, s32 or S33, S34 are performed, which will be described below in detail.

Data analysis S22 and processing steps S31–S34 are repeated until the print start command at the end of data coded in the plotter description language of each page is detected (S23). These steps create the above-described display list in the RAM 12.

After the print start command is received, VRC processing is performed based on the display list to convert the vector data, which has been analyzed so far, into raster data (S24). This raster-converted image data are stored in the frame memory (located in the RAM 12) in the bit-mapped format.

One band of print data for use in printing by the ink jet heads is prepared during this VRC processing, and then the actual print operation is started (S25). The VRC processing step S24 and the print processing step S25 are repeated the number of times equal to the number of bands in one page.

The main processing performed as a result of data analysis is a vector data storing processing, in which the start-point and end-point coordinates of the vector (thick line), line thickness (width) information, and data defining the thick-line connecting shape and the thick-line tip shape are stored in the display list to perform a VRC processing (S32). Together with the vector data storing processing, the thick-line shading data pattern is stored in the display list for rasterizing the thick-line (S31). This is a data pattern for defining the shading or grayscale level of a thick-line, which is referenced when the thick-line is rasterized. Also stored in the display list are the coordinates of a filled-in area (vertex data of polygon, etc.) (S33). Together with this step, a fill-in data pattern used for rasterizing the filled-in area is also stored in the display list (S34).

An example of thick line data and filled-in area data, as well as an example of a display list created corresponding to them, will now be described.

Figure 4:
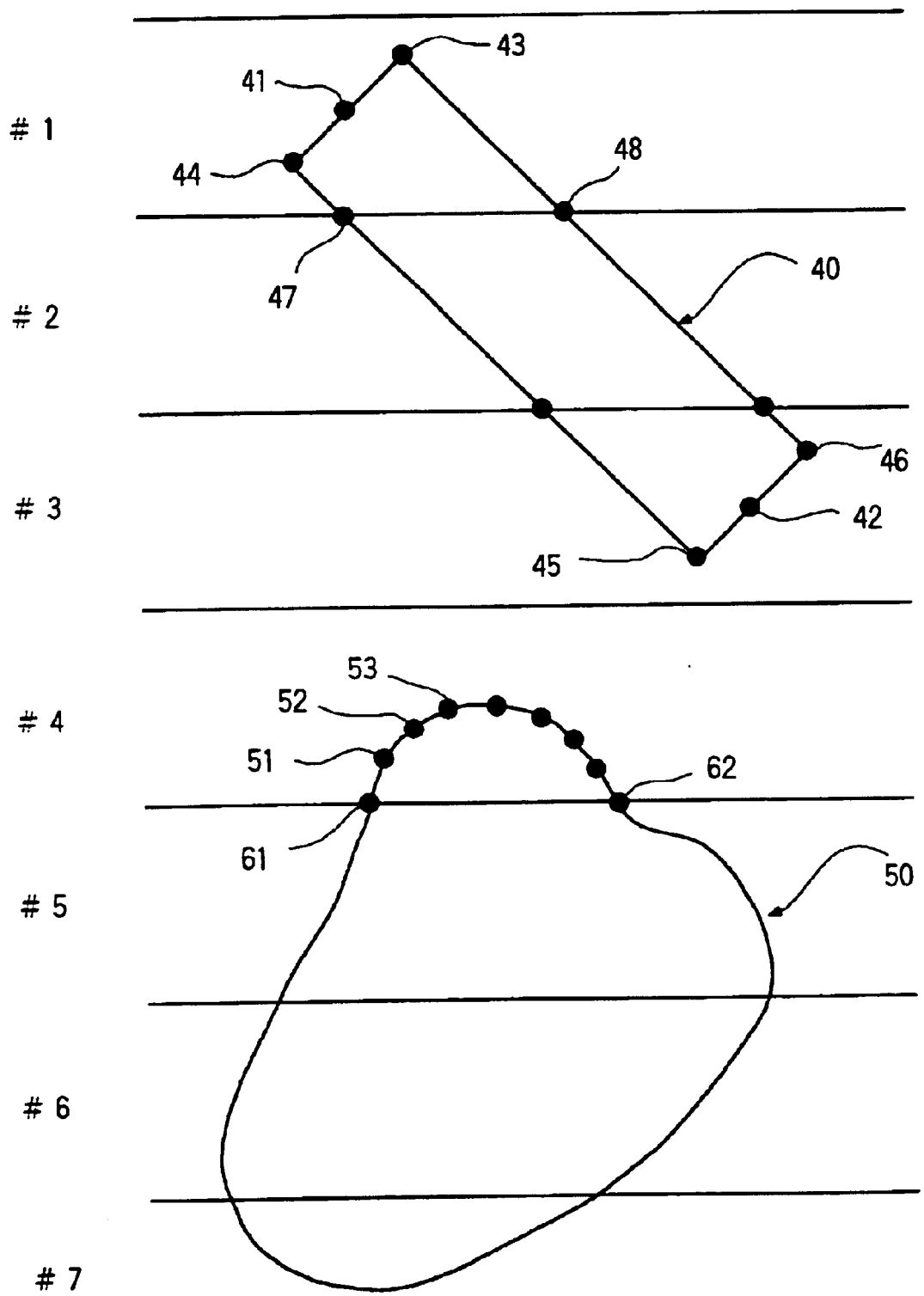
FIG. 4 is a diagram showing an example of an image formed in the frame memory when the plotter shown in FIG. 1 analyzes a thick line and a filled-in area and converts them into raster data.

FIG. 4 shows examples of images formed in the frame memory when thick-line data and filled-in area data are analyzed and rasterized.

For a thick line 40 defined by a start point 41 and an end point 42, the coordinates of four vertices 43, 44, 45, and 46 of a rectangle, which indicate a line with a thickness or width (thick-line), are calculated based on the line thickness data. Also, the coordinates of the crossing points 47, 48, . . . at the intersection between the rectangle outline (contour) and the band boundaries are calculated. For a filled-in area 50, the crossing points 61, 62, . . . at the intersection between the area outline and the band boundaries are calculated from the coordinates of the vertices 51, 52, 53, . . . of the polygon. In the VRC processing that follows, each raster of the closed area to be drawn is filled-in, for each of bands #1, #2, #3, ..., in accordance with the shading data pattern or the fill-in data pattern specified for the area to be drawn (thick-line or filled-in area) based on the coordinates of the vertices and the coordinates of the crossing points.

FIG. 5 shows an example of a display list DL corresponding to the example shown in FIG. 4. In this example, the thick line 40 appears first in band #1 and extends to bands #2 and #3. The filled-in area 50 appears first in band #4 and extends to bands #5, #6, and #7.

Therefore, in the area of a display list 500 corresponding to band #1, a shading data pattern 501 of the thick line 40 and the vertex data (coordinates) 502 (including the crossing points 47, 48, ... described above) of the thick line 40 are stored. The shading data pattern of a thick line, which is the same regardless of the position where the thick-line is drawn, is stored only in the display list area corresponding to the band where the thick-line appears first but not in the areas corresponding to the subsequent bands. In addition, the vertex data of a thick-line are stored only in the display list area corresponding to the band in which the thick line appears first. In the areas corresponding to the subsequent bands over which the thick-line extends, the vertex data of the thick-line in that band are referenced. That is, in the example shown in the figure, the vertex data 502 of the thick line 40 is stored only in the area corresponding to band #1. In the areas corresponding to subsequent bands #2 and #3, stored are addresses 503 and 504 (same value) of the area in which the vertex data 502 of the thick line 40 are stored. For general image data, this display list format reduces the amount of data to be stored therein.

The display list of a filled-in area is also stored as described above. That is, in the display list area corresponding to band #4 where the filled-in area 50 appears first, stored are a fill-in data pattern 505 and vertex data 506 (including crossing points 61, 62, ... ) of the filled-in area 50. In the subsequent areas corresponding to bands #5, #6, and #7, stored are the addresses 507, 508, and 509 (same value) of the area containing the vertex data 506 of the filled-in area. For a filled-in area, as with a thick line, the fill-in data pattern is stored only in the area corresponding to the first band (indicated by band #4 in FIG. 5) but not in the areas corresponding to the subsequent bands.

Alternatively, instead of storing all vertex data only in the area corresponding to the first band of a thick-line (or a filled-in area), the vertex data of each band may be stored in the area corresponding to that band.

Figures 6, 7:
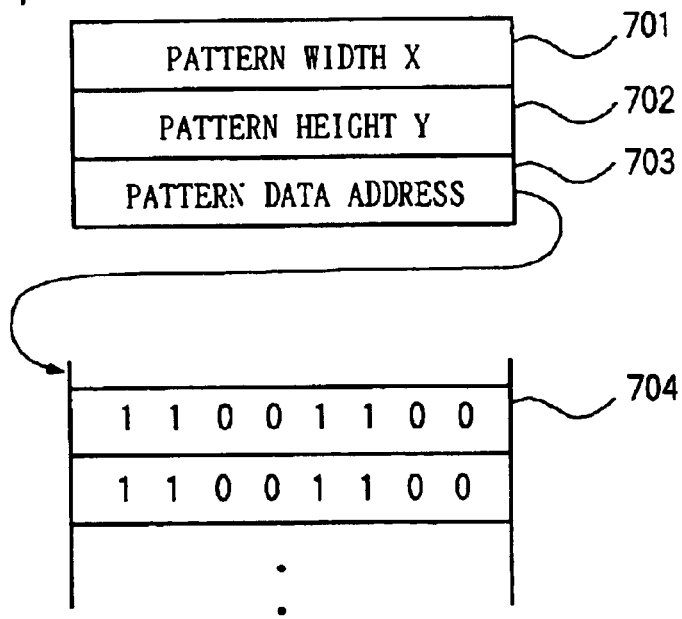
FIG. 6 is a diagram showing an example of the configuration of a thick-line shading data pattern which is used on the plotter shown in FIG. 1.
FIG. 7 is a diagram showing a data structure of the shading data pattern shown in FIG. 6.

FIG. 6 shows an example of the configuration of a shading data pattern. The configuration of a fill-in data pattern is the same as that of a shading data pattern.

A shading data pattern is represented as a dot-pattern matrix defined by x horizontal dots and y vertical dots. In each dot position "1" (print) or "0" (non-print) is set. As shown in FIG. 7, the shading data pattern like this is represented by a pattern width x 701, a pattern height y 702, and pattern data address 703. Pattern data 704 (a string of numeric values 0 and 1) are stored in the storage location specified by the address.

The present invention may be applied also to a configuration in which a plurality of shading data patterns are stored as default data and only the pattern number of a thick-line is specified externally.

Figure 8:
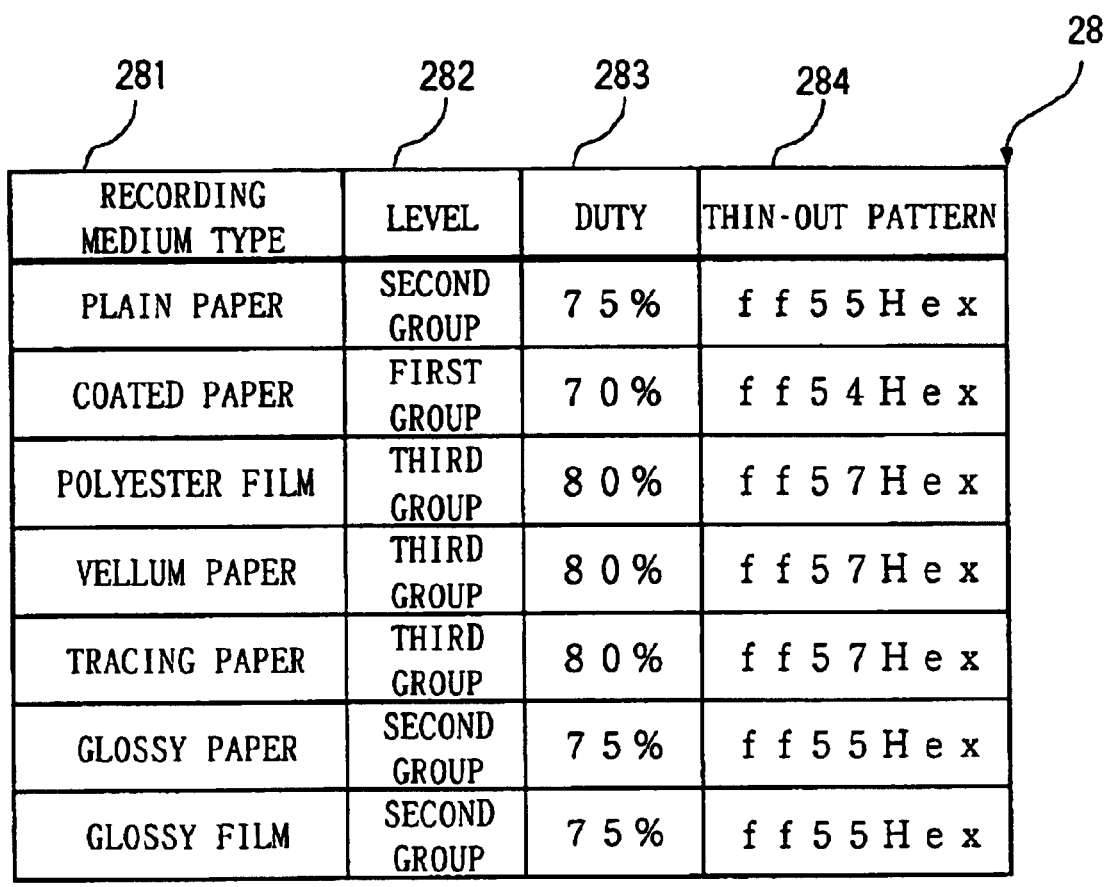
FIG. 8 is a diagram showing an example of a thin-out table which is used in the embodiment of the present invention.

FIG. 8 shows an example of a thin-out table (mask table) 28 used in the embodiment. This thin-out table 28 may be stored in the ROM 13 in advance. The thin-out table 28 classifies recording medium types 281 into a plurality of groups (three groups in this example) and, for each group, defines a target duty factor (Duty) 283 for preventing a splash and a corresponding thin-out pattern 284. This table is provided considering the fact that a splash is more conspicuous when the surface of the recording medium used is white and bright. Another factor to cause a splash is the characteristic of a recording medium which determine the extent of ink running easily thereon. Therefore, in the embodiment of the present invention, the splash conspicuousness levels (to what degree ink runs easily) are divided into three. That is, recording media on which a splash is conspicuous belong to the first group, recording media on which a splash is less conspicuous belong to the second group, and recording media on which a splash is the least conspicuous belong to the third group. The least conspicuous splash of ink belonging to the third group is an amount of the splash which may be observed by examining the surrounding of a filled-in area with the use of a magnifier such as a loupe.

As shown in FIG. 8, the more likely a splash is caused, the smaller the Duty 283 of a group of recording medium types 281 is set. The actual Duty value ranges from 70% to 80% according to the level. This range is selected considering the fact that a 70% or lower value changes the color and that a 80% or higher value is not effective to prevent a splash.

The recording medium type can be detected based on the information set up as external information via the operation units 15 and 16 shown in FIG. 1 or on data entered from the interface 14 shown in FIG. 1.

It is to be understood that the level 282 and the Duty 283 are shown here for illustrative purposes only and that they need not be stored as data in the form of the table 28. The "Hex" in the thin-out pattern 284 indicates that the immediately preceding numeric value is hexadecimal.

Figure 9:
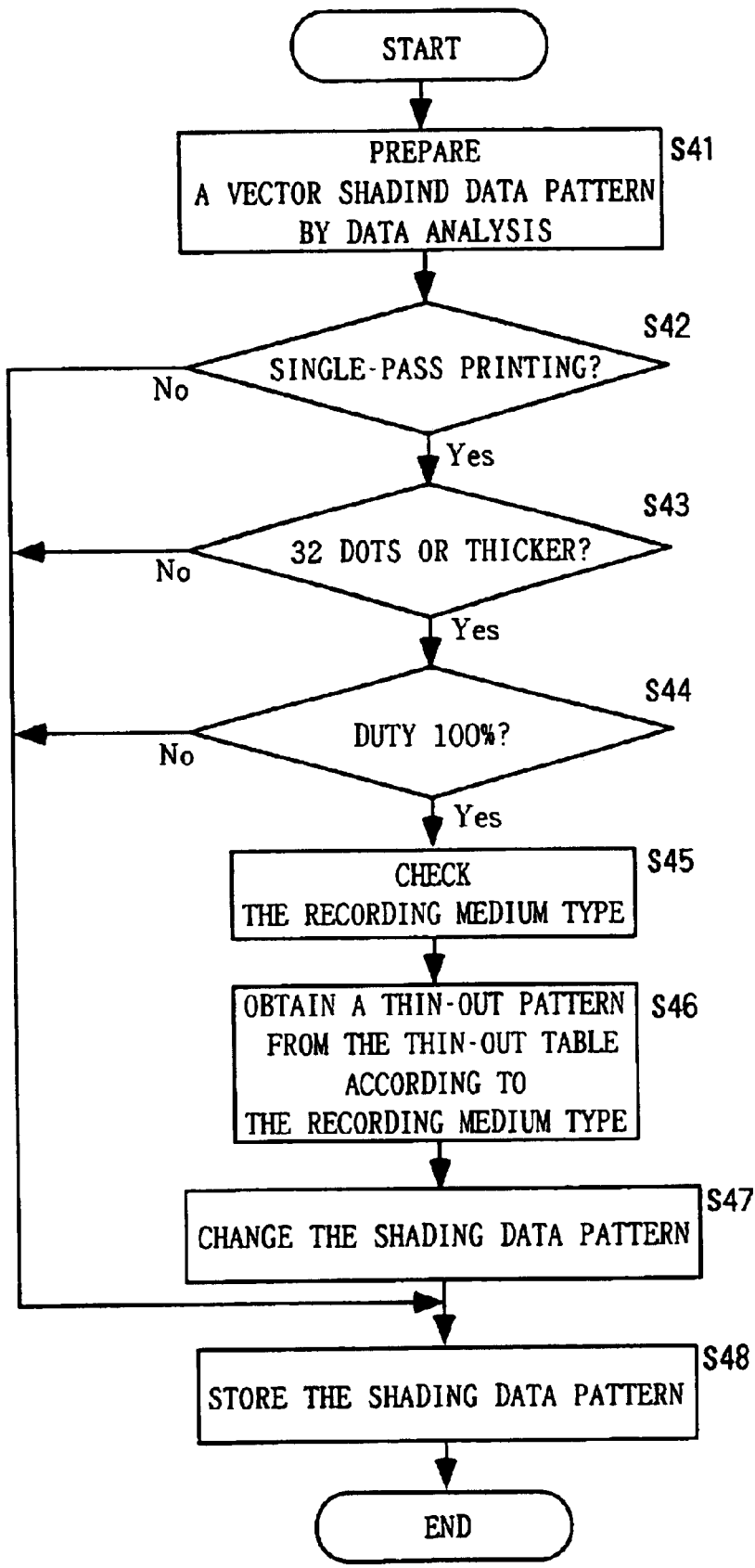
FIG. 9 is a flowchart showing an example of details of vector shading data pattern storing process S31 shown in FIG. 3.

FIG. 9 shows an example of a vector shading data pattern storing processing S31, shown in FIG. 3, in which the thin-out table 28 is used.

In this example, a vector shading data pattern is prepared for a thick-line during data analysis, as in a conventional method (S41). However, it should be noted that, in the method according to the present invention, this pattern is not stored immediately because it may be changed later.

Next, a check is made whether the print mode is a single-pass print mode or a multi-pass print mode (S42). If the print mode is the multi-pass print mode, control is passed to step S48 which will be described later. This is because the multi-pass print mode, in which the ink ejection amount in each pass is small as described above and therefore a splash is less likely to occur, is excluded from the processing of the present invention.

If the print mode is the single-pass print mode, a check is made whether the thick line is 32 dots thick or thicker (S43). If the thick line is thinner than 32 dots, control is passed to step S48, which will be described later, to exclude the line from the processing because there is less need to apply the present invention to such a line.

If the thick line that is 32 dots thick or thicker, a check is made whether the duty factor of the vector shading data pattern is 100% (S44). The duty factor of 100% means that the pattern data (see FIG. 6) is composed of all binary "1"s, that is, solid drawing. If the duty factor is not 100%, control is passed to step S48 which will be described later, judging that a splash will not occur.

If the duty factor is 100%, the type of the recording medium is checked (S45). The thin-out pattern is obtained from the thin-out table 28 according to the type of the recording medium (S46).

The previously-prepared shading data pattern is changed based on this thin-out pattern (S47). That is, logical product pperation is performed on the shading data pattern data and the thin-out pattern. Because the thin-out pattern is shorter in length in most cases, this operation is repeated sequentially for successive parts of the shading data pattern. The shading data pattern changed in this manner is stored in the display list as described above (S48). In the VRC processing that follows, the thick-line is converted into raster by using this shading data pattern.

Figure 10:
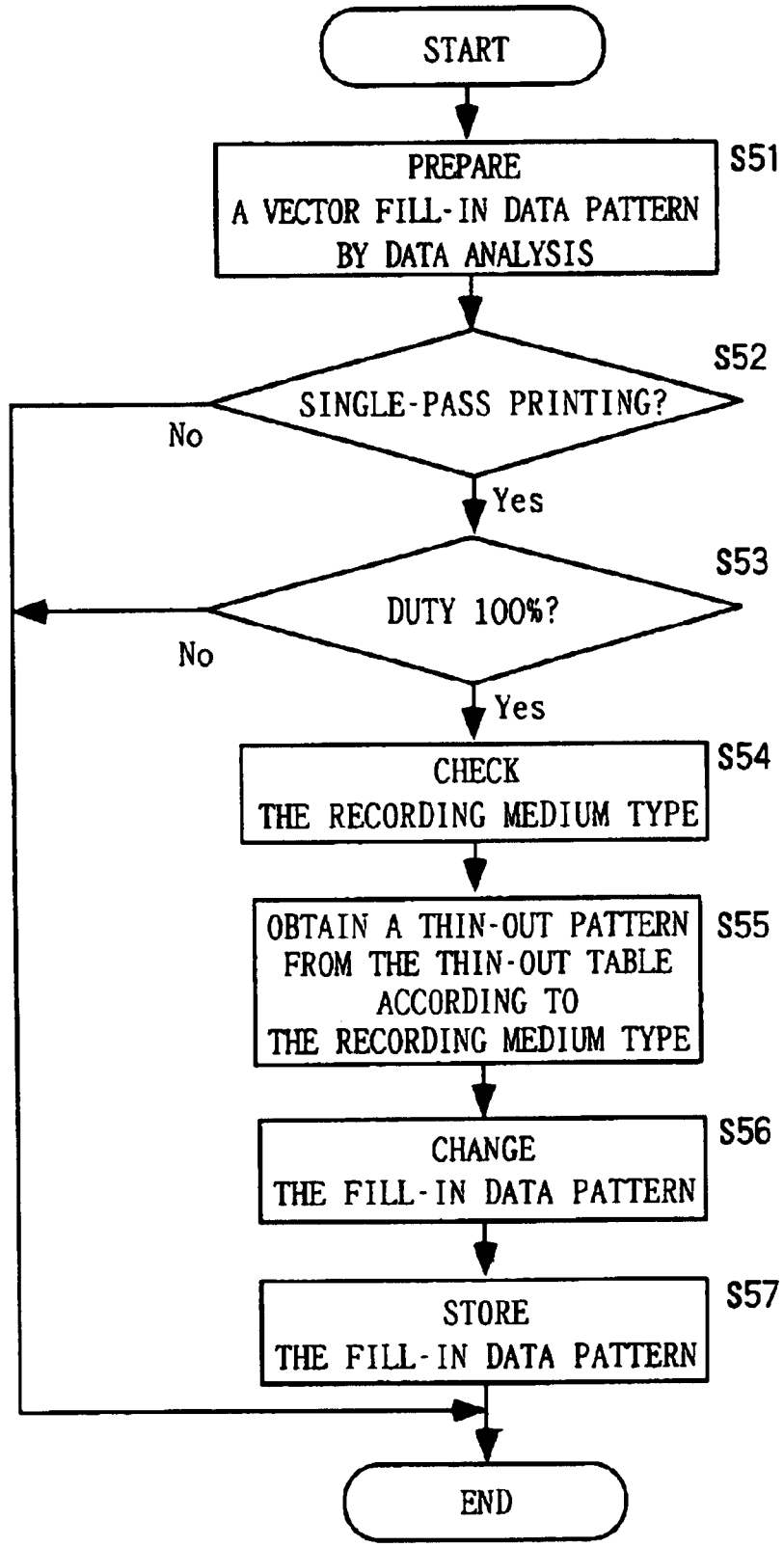
FIG. 10 is a flowchart showing an example of details of fill-in data pattern storing process S34 shown in FIG. 3.

FIG. 10 shows an example of the details of the fill-in data pattern storing processing S34 in FIG. 3 in which the thin-out table 28 is used. Steps S51–S57 in this processing are substantially the same as steps S41–S48 in FIG. 9 except that there is no step corresponding to step S43 and the "shading data pattern" is changed to the "fill-in data pattern". Therefore, the same description is not repeated.

Although the present invention has been described in its preferred embodiment, it is to be understood that various modifications can be made. For example, the thin-out pattern need not necessarily be changed according to the recording medium type. In addition, the numeric values of thin-out patterns for each recording medium are not limited to those shown in FIG. 8.

As a modification of the present invention, data may be thinned out using the thin-out table shown in FIG. 8 when a decompressor (interpreter) for use with compression data, such as run-length or packed-bit compression data received as image data, finds that the ink is ejected to print a solid-drawing area. This is because, when the compression data are run-length or packed-bit compression data, it is easy to determine whether or not the data are solid-drawing data.

According to the present invention, the interpreter detects a solid-drawing area and thins out ink dots from the solid-drawing area. This arrangement allows the ink jet recording device to do correction and to reduce splashes in a solid-drawing area without having to change the processing performed on an external computer terminal and so on.

The above processing, which is performed by the interpreter, eliminates the need for checking the frame memory for finding filled-in areas, reducing the processing load.

In addition, separately preparing mask patterns for reducing the density according to factors, such as the size of the area to be corrected and the recording medium type, allows better splash-reducing correction processing to be performed.

Industrial Applicability

The present invention is applicable to the design and manufacturing of an ink-jet recording device.

What is claimed is:

1. An ink jet recording method which receives a command and data which indicate a drawing of a thick line or a filled-in area, analyzes the command and the data by an interpreter, converts vector data of the thick line or the filled-in area into raster data based on a specified data pattern which contains a predetermined matrix of ON and/or OFF dots, after the analysis, and, based on the raster data, ejects ink droplets while moving a recording head over a recording medium with a plurality of ink ejection nozzles arranged thereon, said method comprising the steps of:

before converting to the vector data to the raster data, checking by said interpreter whether the data pattern indicates solid-drawing in the thick line or the filled-in area or which the drawing is indicated;

if the data pattern specified to a particular thick line or filled-in-area indicates solid-drawing, changing the data pattern for that particular thick line or filled-in-area to a data pattern of a lower-density for preventing an ink splash during printing; and converting the vector data of the thick line or the filled-in area into raster data based on the vector data and the data pattern when ejecting ink droplets according to the raster data;

wherein said recording method is performed while operating said recording head in a single pass recording mode.

2. The ink jet recording method according to claim 1 wherein said interpreter changes the data pattern by using a predetermined mask pattern.

3. The ink jet recording method according to claim 2 wherein one mask pattern is selected from a plurality of predetermined mask patterns according to a type of the recording medium.

4. The ink jet recording method according to claim 1 wherein if a thickness of a given thick line is smaller than a predetermined thickness no change is made in the data pattern for the given thick line even if the data pattern indicates solid-drawing.

5. The ink jet recording method according to claim 1 wherein the data pattern is changed at least for black ink.

6. The ink jet recording method according to claim 1 wherein said single pass recording method mode comprises a method in which one band of an image is recorded in one head movement of the recording head, said one band corresponding to a width of said recording portion of said recording head.

7. An ink jet recording device comprising:

an interpreter for analyzing a command and data which indicate a drawing of a thick line or a filled-in area;

means for converting vector data of the thick line or the filled-in area into raster data based on the vector data and a specified data pattern which contains a predetermined matrix of ON and/or OFF dots, after the analysis by the interpreter; and a recording head for ejecting ink droplets, based on the raster data, while moving over a recording medium with a plurality of ink ejection nozzles arranged thereon, wherein said interpreter includes a pattern changing means for checking whether the data pattern indicates solid-drawing in the thick line or the filled-in area for which the drawing is indicated and, if the solid-drawing is indicated, changing the data pattern for the thick line or filled-in area to a data pattern of a lower-density.

8. The ink jet recording device according to claim 7 wherein said pattern changing means changes the data pattern by using a predetermined mask table which stores therein a predetermined mask pattern.

9. The ink jet recording device according to claim 8 wherein said predetermined mask table contains a plurality of mask patterns each corresponding to a type of the recording medium and wherein said pattern changing means selects one of the mask patterns according to the type of the recording medium used.

10. The ink jet recording device according to claim 7, further comprising means for checking a thickness of the thick line and means for preventing the change of the data pattern when the thickness of the thick line is smaller than a predetermined thickness.

11. The ink jet recording device according to claim 7 wherein said pattern changing means changes the data pattern at least for black ink.

12. The ink jet recording device according to claim 7 wherein said single pass recording mode comprises a method in which one band of an image is recorded in one band movement of the recording head, said one band corresponding to a width of a recording portion of said recording head.

* * * * *